United States Patent [19]

Mills

[11] 4,069,875
[45] Jan. 24, 1978

[54] ROLLING RING

[75] Inventor: Franky D. Mills, Plainview, Tex.

[73] Assignee: The Hamby Company, Plainview, Tex.

[21] Appl. No.: 662,729

[22] Filed: Mar. 1, 1976

[51] Int. Cl.² ............................................. A01B 29/04
[52] U.S. Cl. ...................................... 172/548; 172/1; 172/555
[58] Field of Search .............. 172/537, 548, 549, 554, 172/555, 551, 604, 540, 380, 1

[56] References Cited

U.S. PATENT DOCUMENTS

| 1,091,243 | 3/1914 | Rasmussen | 172/537 X |
| 2,472,386 | 6/1949 | Schmeiser | 172/548 X |
| 2,573,037 | 10/1951 | Lutes | 172/540 |
| 2,596,574 | 5/1952 | Lutes | 172/555 |
| 2,642,305 | 6/1953 | Butler | 172/380 X |
| 3,547,204 | 12/1970 | Urban | 172/554 X |

FOREIGN PATENT DOCUMENTS 100,082   1/1965   Denmark .............. 172/380

Primary Examiner—Paul E. Shapiro
Attorney, Agent, or Firm—Wendell Coffee

[57] ABSTRACT

A rolling ring for a loose ring packer-mulcher is fabricated from a strap of mild steel. Spurs are punched from the strap by a lance die and the strap is rolled to a ring and welded together.

3 Claims, 5 Drawing Figures

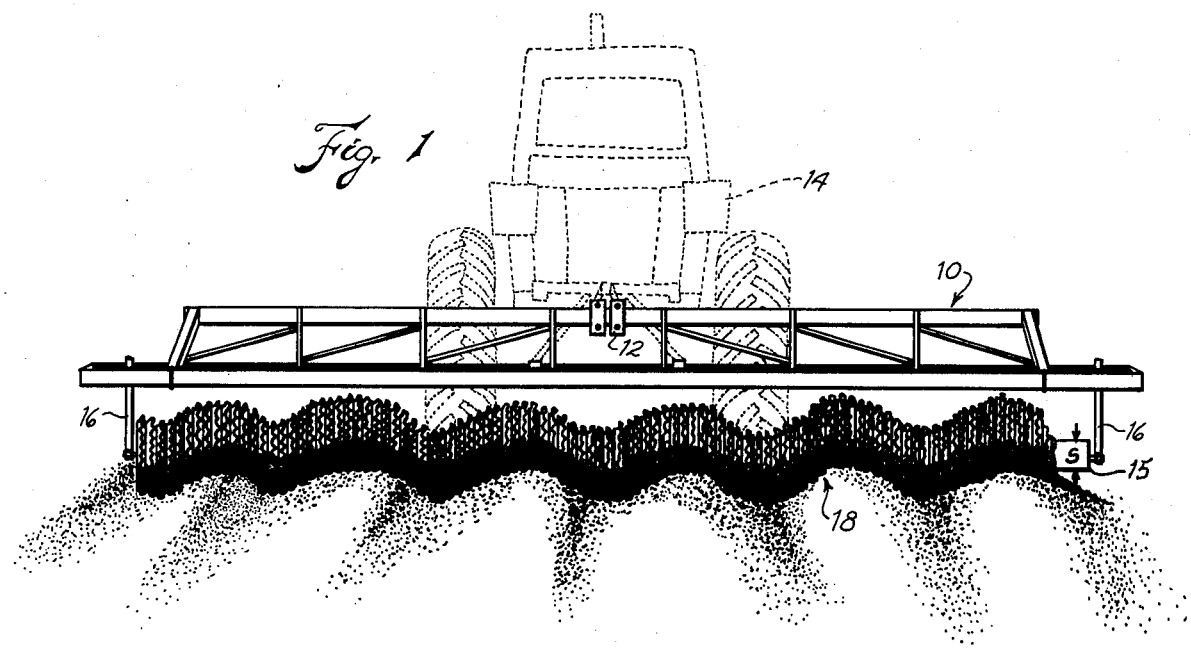
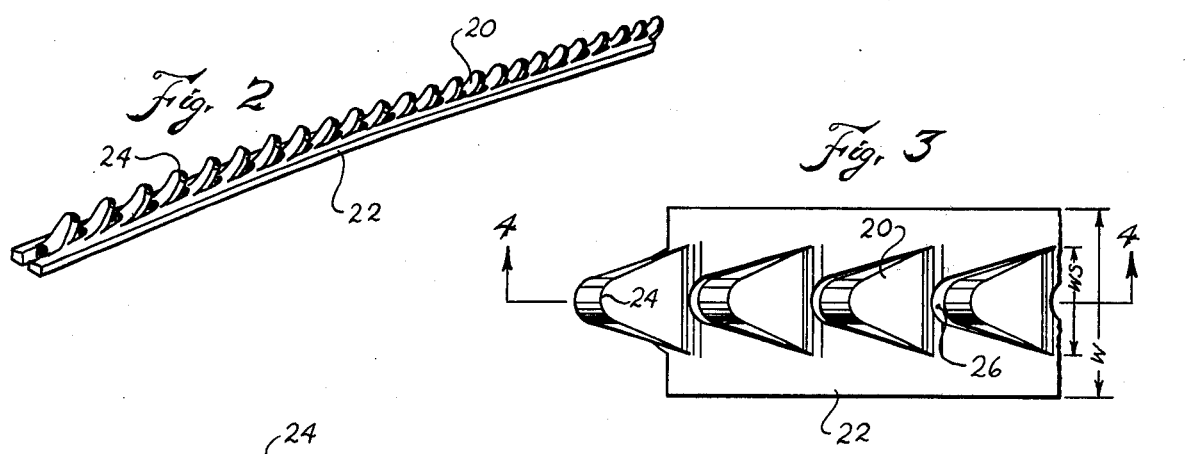
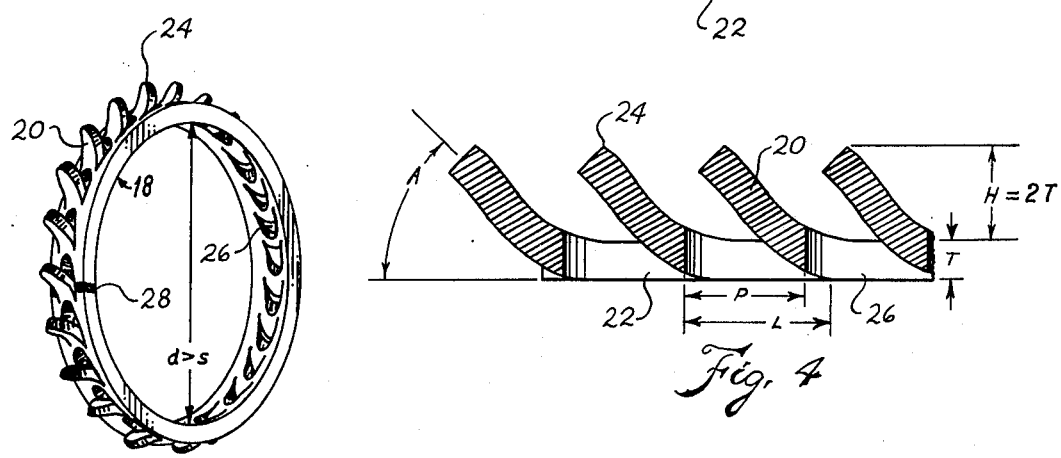

ROLLING RING

BACKGROUND OF THE INVENTION

1. Field of the Invention.

This invention relates to agricultural loose ring packer-mulchers and more particularly to a fabricated rolling ring therefor.

2. Description of the Prior Art.

In modern agriculture many implements have been devised to pack the surface of cultivated soil and mulch the surface. One of these implements is called a "loose ring packer-mulcher." In it, a long shaft is towed normal to the direction of draft.

According to the prior art, heavy cast iron rolling rings having prongs protruding from them are placed over the shaft. The inner diameter each ring is about twice the diameter of the shaft. From one end of the shaft to the other, the shaft is filled with rings so that each ring abuts the ring adjacent to it to keep it upright. Therefore, when the implement is towed over the land, each ring drops or rises to its own level conforming to the plowed field. When the implement is pulled over the furrowed ground, each ring carries about the same weight. The weight of the rings pack the soil while the prongs on the rings mulch the surface.

SUMMARY OF THE INVENTION

1. New and Different Function and Method.

I have devised a fabricated rolling ring and a method of fabricating a ring from a strap of mild steel. According to my method of fabrication, the strap mild steel is first punched, projecting a series of V-shaped spurs from the strap. These projections are called "spurs" although they might equally well be described as "teeth" or "lugs" or "offshoots" or "bills".

Thereafter, the strap is rolled or formed into circle and the ends of the strap are welded together to complete the fabrication of the ring.

These fabricated rolling rings are used in the same way as the cast iron rolling rings of the prior art, however, I have found that by making about a 7kg (16 pounds) ring of the same width as the cast iron rings, which weigh about 8-½kg (19 pounds), a better job of packing and mulching is performed. I do not know why my rings do a better job of packing and mulching, but I think because of the V-shaped spurs which are formed by the punching operation, a sharp point is projected from the outer peripheral face of the ring. The cast iron rings have a flat surface on the outer face of the end of the prongs; therefore, I think the shape of the spur formed by punching the spurs or teeth from the strap make a better shaped tool which results in better mulching.

The fabricated rings do not break as easily as cast iron rings. They also wear less than ones made of cast iron.

2. Objects of this Invention.

An object of this invention is to pack and mulch the soil, particularly a furrowed field.

Other objects are to achieve the above with a device that is sturdy, durable, lightweight, simple, efficient, versatile, and reliable, yet inexpensive and easy to manufacture, and maintain.

Further objects are to achieve the above with a method that is rapid, efficient, and inexpensive, and does not require skilled people to adjust, operate, and maintain.

The specific nature of the invention, as well as other objects and advantages thereof, will clearly appear from the following description and from the accompanying drawing, the different views of which are not necessarily to the same scale.

BRIEF DESCRIPTION OF THE DRAWING

FIG. 1 is a perspective view a loose ring packer-mulcher connected to a tractor.

FIG. 2 is a perspective view of a strap with spurs punched therefrom according to this invention.

FIG. 3 is a top plan view of a portion of the strap with spurs (or substantially a diametric view of a portion of the ring).

FIG. 4 is a sectional view of the punched strap taken substantially on line 4—4 of FIG. 3.

FIG. 5 is a perspective view of the ring after complete fabrication.

DESCRIPTION OF THE PREFERRED EMBODIMENT

Referring more particularly to the drawing, in FIG. 1 thereof, there may be seen what is herein called a loose ring packer-mulcher which includes elongated frame 10. The frame includes draft means 12 in the form of a conventional three-point hitch by which an implement is attached to a draft vehicle, namely, standard agricultural tractor 14. Shaft 15 in the form of a pipe is attached to the frame by depending arm 16. It will be understood that the shaft is the axle of the series of loose rolling rings 18. Therefore, it may be seen that the shaft is normal or at right angles to the direction of draft as determined by the tractor 14. It will be understood that it is customary to use a pipe as the shaft having an outside diameter of about 15cm (six inches) and the length of the shaft is long enough to cover four to six rows as is customary with agricultural implements. Rings 18 each have an inside diameter of about twice the shaft diameter or 30cm (12 inches).

It will be understood by those skilled in agricultural arts that what has been described above is conventional and commonly available on the market today.

According to my improved method of forming the ring, first, V-shaped spurs 20 are punched or struck from strap 22 of mild steel by conventional fabricating practice. I have found that a lance die performs this task satisfactorily. Specifically describing in detail: the strap 22, of mild steel, will be about one meter (40 inches) long, about 13mm (½ in.) thick "T", and about 60mm (2-½ inches) wide "W". The width "W" will also be the width of the inner and outer peripheral faces of the finished ring 18 and the thickness "T" will be the thickness of the parallel radial faces of the finished ring. The thickness "T" is about 1/5th the width "W". The spurs will be spaced at a pitch "P" of 42mm (1-21/32 inch). However, the length "L" of each spur will be about 49mm (1-15/16 inch); therefore, it may be seen that the pitch "P" is about ⅚ths the length "L" of the spur, which is to say that each spur (or the base metal from which it was struck) overlaps the adjacent spur.

The spur 20 will have a point 24 which will be a height "H" of about 26mm (one inch) above the outer peripheral face. Thus, the spurs will project at an angle "A" of about 45° from the strap. Each point 24 will be symmetrical about a diametrical plane, being about 45% on each side, which I believe results in superior mulching. The spur height "H" will be about twice the ring thickness "T" and the finished ring will have a point diameter of about 80mm more than the inside peripheral face diameter. The point diameter will be about 38cm (15 inches).

The V-shaped spur 20 at the base will have a spur width "WS" of about 40mm or about ⅔rds the width or "W" of the strap, and the spur width "WS" will be about 4/5ths the spur length "L". The completed ring will weigh about 7kg (16 pounds) which is about 1-½kg less than the comparable cast iron type. It may be seen in FIG. 3 that the points 24 will be along the center line of the strap 22 and thus the ring 18. It will be observed that as the spurs are punched out, perforations 26 are formed in the strap 22 from which the metal of each spur was projected. The "V" will have an angle of about 30°.

After the spurs 20 are punched, the strap 22 is formed into the ring 18 and the ends of the strap are connected together by weld 28.

As an aid to correlating the terms of the claims to the exemplary drawing, the following catalog of elements is provided:

| | |
|---|---|
| 10 frame | "A" angle |
| 12 draft means | "W" width |
| 14 tractor | "WS" spur width |
| 16 arm, depending | "p" pitch |
| 18 rings, rolling | "L" length of spur |
| 20 spurs | "T" thickness |
| 22 strap | "H" height |
| 24 point, spur | |
| 26 perforations | |
| 28 weld | |

The embodiment shown and described above is only exemplary. I do not claim to have invented all the parts, elements or steps described. Various modifications can be made in the construction, material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. In a loose ring packer-mulcher having
   a. an elongated frame,
   b. draft means on the frame for pulling it in a direction of draft over a field, and
   c. a shaft on the frame normal to the direction of draft;
   d. the improved rolling ring, a plurality of which are loosely mounted on the shaft, comprising:
   e. an inner and outer peripheral face,
   f. two parallel radial faces normal to the peripheral faces,
   g. the diameter of the inner peripheral face is greater than twice the diameter of the shaft,
   h. a plurality of spurs projecting from the outer peripheral face, and
   j. a perforation in the peripheral face for each spur from which the spur was projected,
   k. the spurs are each V-shaped when viewed diametrically,
   m. the V-shaped spurs each present a point on the periphery of the ring,
   n. each of said points is a distance from the outer peripheral face of approximately twice the thickness of the ring.
   p. the width of the base of the "V" is about ⅔rds the width of the peripheral faces and
   q. the width of the base of the "V" is about 4/5ths the length of the spur.

2. The invention as defined in claim 1 with an additional limitation of
   r. said spurs extend at about a 45° angle from the outer perpheral face.

3. The invention as defined in claim 2 wherein each ring is about 30 cm inner peripheral face diameter, the radial face about 13mm thick, and the point diameter is about 80mm more than the inner peripheral face diameter, and the ring is about 60mm wide.

* * * * *